(12) United States Patent  (10) Patent No.: US 6,736,144 B2
James  (45) Date of Patent: May 18, 2004

(54) FELT PROTECTOR

(75) Inventor: Terry Henry James, 1311 Sunnyside Dr., Cayce, SC (US) 29033

(73) Assignee: Terry Henry James, Cayce, SC (US)

( * ) Notice: Subject to any disclaimer, the term of this patent is extended or adjusted under 35 U.S.C. 154(b) by 125 days.

(21) Appl. No.: 09/983,128

(22) Filed: Oct. 23, 2001

(65) Prior Publication Data

US 2003/0075192 A1 Apr. 24, 2003

(51) Int. Cl.$^7$ ................................................. A24F 13/00
(52) U.S. Cl. ....................................................... 131/329
(58) Field of Search .......................... 296/37.9; 131/329, 131/231, 240.1, 241; 232/43.1; D12/401, 411, 190; D27/104, 137

(56) References Cited

U.S. PATENT DOCUMENTS

| | | | | |
|---|---|---|---|---|
| 2,289,701 A | * | 7/1942 | Engel et al. | |
| 3,189,143 A | * | 6/1965 | Adams | 52/208 |
| 3,698,675 A | * | 10/1972 | Lerew et al. | 248/311.2 |
| 3,712,235 A | * | 1/1973 | Russ | 108/46 |
| D244,302 S | * | 5/1977 | Bradley | D27/14 |
| D256,279 S | * | 8/1980 | Huggins | D27/14 |
| 4,523,783 A | * | 6/1985 | Yamada | 296/93 |
| 4,749,112 A | * | 6/1988 | Harper | 224/553 |
| 4,765,581 A | * | 8/1988 | Wallace et al. | 248/311.2 |
| 4,787,187 A | * | 11/1988 | Feldmann | 52/204.591 |
| 4,844,400 A | * | 7/1989 | Jasmagy, Jr. | 248/311.2 |
| 5,148,755 A | * | 9/1992 | Morales | 108/47 |
| 5,163,248 A | * | 11/1992 | Bielis et al. | 49/441 |
| 5,544,448 A | * | 8/1996 | Mass | 49/377 |
| 5,651,523 A | * | 7/1997 | Bridges | 248/311.2 |
| 5,938,160 A | * | 8/1999 | Hartmann et al. | 248/311.2 |
| 6,030,020 A | * | 2/2000 | Malm | 296/93 |

* cited by examiner

Primary Examiner—Steven P. Griffin
Assistant Examiner—Carlos Lopez

(57) ABSTRACT

A smoking accessory that protects the felt along the interior of a vehicle's window from the damages of hot ash being thumped out the window by the vehicle's occupants. Once installed in the vehicle's glass groove, the accessory is self-supporting and gives continued protection to the felt behind it from the constant abuse that it is subjected to by smokers.

4 Claims, 1 Drawing Sheet

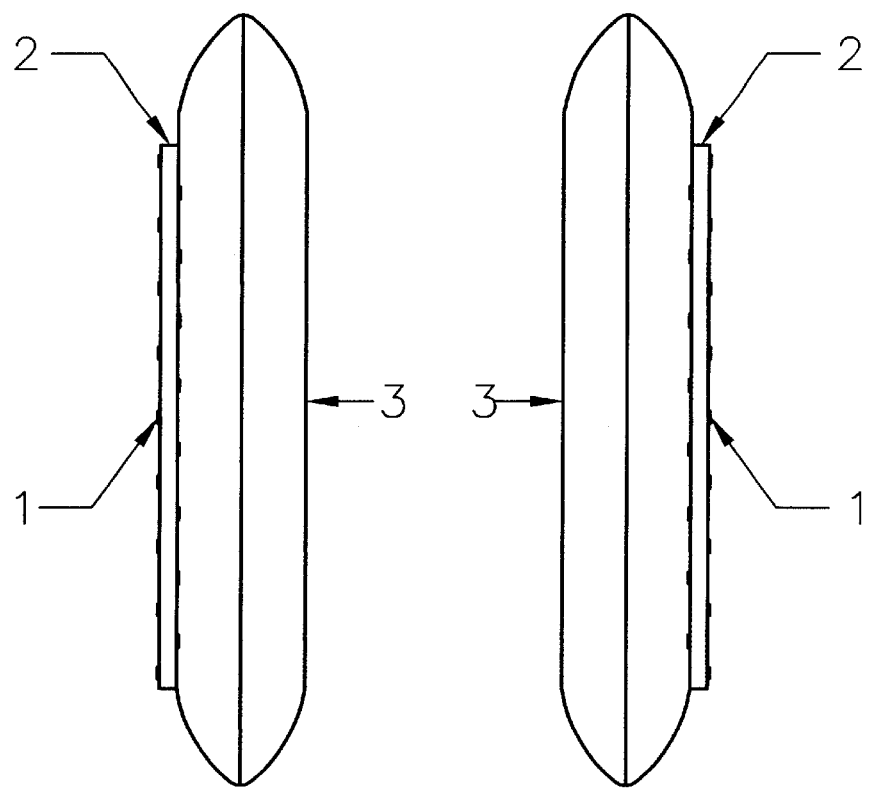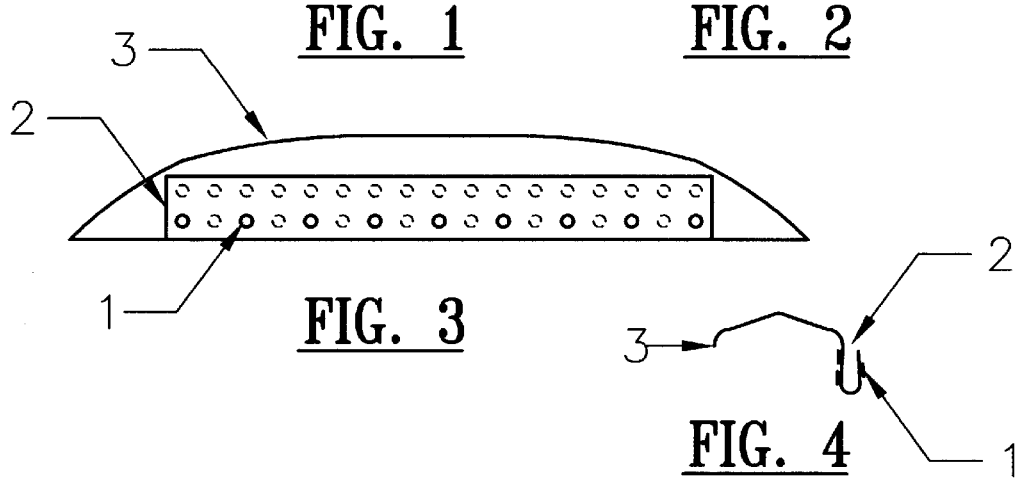

FELT PROTECTOR

CROSS REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO A MOCROFICHE APPENDIX

NOT APPLICABLE

BACKGROUND OF THE INVENTION

The present invention relates generally to tobacco accessories, and more particularly is directed towards protecting the felt along the inside of a vehicles window, where smokers generally tend to thump the hot ash from the end of their tobacco products, thus permanently damaging the felt along the windows edge.

There have been no previous attempts to solve this problem, therefore there is no related prior art to compare it to.

BRIEF SUMMARY OF THE INVENTION

The present invention is a device for protecting the felt along the inside of a vehicles window from being scarred and burnt by the hot ends and ash of tobacco products being consumed by the occupants of the vehicle while they smoke. There is a "U" shape to one side of the invention that is pushed up into the glass groove of the window when the window is fully raised. Fully penetrating points are pressed through the material of the invention along both of the outer sides of the "U" shape during the manufacturing process. The points are formed along the outside edges of the "U" and grip the felt on the inside of the vehicles glass groove and hold the invention in place while the window is lowered. The remaining exposed part of the invention then covers an area of the felt and acts as a guard that protects the felt from the damages of hot ash that smokers tend to burn the area along the windows edge with.

The main objective of the invention is to inexpensively supply the public with a felt protector that is quickly connectable to the various shapes of vehicles throughout the world.

BRIEF DESCRIPTION OF THE SEVERAL VIEWS OF THE DRAWING

FIG. 1 is a view of the top of the present invention.

FIG. 2 is a view of the bottom of the present invention.

FIG. 3 is a side view of the present invention.

FIG. 4 is a view of the end of the present invention.

DETAILED DESCRIPTION OF THE INVENTION

FIG. 1 details the top view of the present invention in where item 1 identifies the two rows of pressed out points on either of the outer sides of, 2 the glass groove which grip the felt along the glass groove of a vehicles window and allow the invention to be self supporting. Item 2 identifies the glass groove of the invention, which is itself recessed into the glass groove of a vehicles window once the invention is installed. The installation itself is simple and only takes three quick steps. First roll the window down a little, place item 2 of the invention along the glass groove of the vehicles window with the opening of item 2 facing out. Then fully raising the window presses item 2 into the glass groove of the vehicle where the said item 1 then grips the felt and holds the invention in place. The remaining exposed item 3 then acts as a guard against the damages from the hot ash of tobacco products and protects the felt in the chosen area where the installer has chosen to regularly thump their ashes out of the vehicles window.

FIG. 2 details the bottom view of the invention. Item 1 shows the pressed out points which grip the felt, item 2 shows the glass groove which is ¼ inch wide and 4 inches long. Item 3 represents the exposed portion of the invention referred to as the guard and is 6 inches in length and 1 and ¼ inches in width.

FIG. 3 details the side view of the invention. Item 1 shows the two rows of pressed out gripping points along, item 2 the glass groove. Item 3 shows the portion known as the exposed guard, after installation.

FIG. 4 details a end view of the invention. Item 1 identifies the two rows of pressed out gripping points along the outside of, item 2 the glass groove. Item 3 shows the exposed guard and thickness of the material that the invention is made out of, 1 millimeter thick clear plastic.

What I claim as my invention is:

1. A device for protecting window felt of a vehicle from damage from burning tobacco products, said vehicle having a window frame with a felt-lined groove for a window, said device comprising: a guard being six inches on length and one and a quarter inch in width;

a glass groove attached to said guard and formed to be insertable into a groove for a window, said groove of said window being lined with felt; and plural pressed-out points formed in said glass groove and adapted to grip said felt lining said groove of said window, thereby holding said device in place.

2. The device as recited in claim 1, wherein said pressed-out points are formed in rows.

3. The device as recited in claim 1, wherein said glass groove is ¼ inch in width.

4. The device as recited in claim 1, wherein said guard is made of plastic.

* * * * *